United States Patent
Tamachi et al.

(10) Patent No.: US 11,776,331 B2
(45) Date of Patent: Oct. 3, 2023

(54) NOISE ESTIMATION DEVICE AND VEHICLE CONTROL DEVICE

(71) Applicant: TOYOTA JIDOSHA KABUSHIKI KAISHA, Toyota (JP)

(72) Inventors: Toshiaki Tamachi, Seto (JP); Masato Nakano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 17/499,948

(22) Filed: Oct. 13, 2021

(65) Prior Publication Data

US 2022/0148350 A1  May 12, 2022

(30) Foreign Application Priority Data

Nov. 9, 2020  (JP) .................................. 2020-186448

(51) Int. Cl.
| | |
|---|---|
| *G07C 5/08* | (2006.01) |
| *B60W 20/30* | (2016.01) |
| *B60W 20/40* | (2016.01) |
| *B60W 20/20* | (2016.01) |
| *G06N 20/00* | (2019.01) |
| *B60W 50/14* | (2020.01) |

(52) U.S. Cl.
CPC .......... *G07C 5/0833* (2013.01); *B60W 20/20* (2013.01); *B60W 20/30* (2013.01); *B60W 20/40* (2013.01); *B60W 50/14* (2013.01); *G06N 20/00* (2019.01); *G07C 5/0841* (2013.01); *B60W 2510/0638* (2013.01)

(58) Field of Classification Search
CPC .... G07C 5/0833; G07C 5/0841; G06N 20/00; B60W 20/20; B60W 20/30; B60W 20/40; B60W 50/14; B60W 2510/0638
See application file for complete search history.

(56) References Cited

U.S. PATENT DOCUMENTS

| 5,967,940 A | 10/1999 | Yamaguchi |
| 6,439,082 B1 | 8/2002 | Onuki |

(Continued)

FOREIGN PATENT DOCUMENTS

| JP | H08-122140 A | 5/1996 |
| JP | H11-93725 A | 4/1999 |

(Continued)

*Primary Examiner* — Ramsey Refai
(74) *Attorney, Agent, or Firm* — Oliff PLC (57) ABSTRACT

A control device as a noise estimation device is applied to a vehicle including an internal combustion engine as a power source and a transmission as a power transmission mechanism. The control device is provided with a storage device that stores mapping data, which is data that defines a mapping learned by machine learning, and a CPU as an execution unit. When variables on an output of the power source and variables indicating a state of the power transmission mechanism are input as input variables, the mapping outputs, as output variables, variables indicating a sensory level of noise caused when rattling sound generated by the operation of the power transmission mechanism is transmitted to a cabin of the vehicle. The CPU estimates the sensory level based on the values of the output variables output from the mapping by inputting the values of the input variables into the mapping.

6 Claims, 3 Drawing Sheets

(56) References Cited

U.S. PATENT DOCUMENTS

| | | | | |
|---|---|---|---|---|
| 6,483,265 | B1* | 11/2002 | Hollenbeck | H02P 6/10 |
| | | | | 318/448 |
| 7,222,004 | B2* | 5/2007 | Anderson | G01C 21/3461 |
| | | | | 180/65.265 |
| 8,167,064 | B2* | 5/2012 | Iwase | B60W 10/08 |
| | | | | 180/65.265 |
| 10,137,884 | B2* | 11/2018 | Oyama | B60K 6/365 |
| 2008/0122391 | A1* | 5/2008 | Iwase | B60W 10/08 |
| | | | | 318/460 |
| 2016/0347306 | A1 | 12/2016 | Oyama | |

FOREIGN PATENT DOCUMENTS

| | | |
|---|---|---|
| JP | 2001-140997 A | 5/2001 |
| JP | 2008-265615 A | 11/2008 |
| JP | 2016-222090 A | 12/2016 |
| JP | 2017-114252 A | 6/2017 |

* cited by examiner

NOISE ESTIMATION DEVICE AND VEHICLE CONTROL DEVICE

CROSS-REFERENCE TO RELATED APPLICATION

This application claims priority to Japanese Patent Application No. 2020-186448 filed on Nov. 9, 2020, incorporated herein by reference in its entirety.

BACKGROUND

1. Technical Field

The present disclosure relates to a noise estimation device that estimates noise generated by a rattling sound, and a vehicle control device.

2. Description of Related Art

Japanese Unexamined Patent Application Publication No. 2008-265615 discloses a vehicle control device that operates an electric motor before starting an internal combustion engine so as to close a clearance between gears engaging with each other on a path through which power is transmitted. By closing the clearance between the teeth of the gears in advance, it is possible to control the rattling sound generated when starting the internal combustion engine that is stopped.

SUMMARY

The rattling sound may be generated at times other than when the internal combustion engine is started. For example, the rattling sound may be generated while the vehicle travels. It is necessary that the noise generated by the rattling sound which occurs while the vehicle travels be controlled. In order to control the noise generated by the rattling sound which occurs while the vehicle travels, it is necessary to estimate whether a driving state of the vehicle is such that the noise generated by the rattling sound is likely to be generated.

Challenges and advantageous effects therefrom will be described. A noise estimation device is applied to a vehicle provided with a power source and a power transmission mechanism that transmits power output by driving the power source. The noise estimation device includes an execution unit and a storage device. The storage device stores mapping data which is data defining a mapping learned by machine learning. When a variable on an output of the power source and a variable indicating a state of the power transmission mechanism are input to the mapping as input variables, the mapping outputs, as output variables, variables indicating a sensory level of noise caused when the rattling sound generated by the operation of the power transmission mechanism is transmitted to a cabin of the vehicle. The execution unit acquires the variables on the output of the power source and the variables indicating the state of the power transmission mechanism as values of the input variables, and estimates the sensory level based on values of the output variable output from the mapping by inputting the values of the input variables into the mapping.

With the configuration stated above, the variables indicating the sensory level are output by inputting the variables on the output of the power source and the variables indicating the state of the power transmission mechanism into the mapping. That is, the sensory level can be estimated based on the variables on the output of the power source and the variables indicating the state of the power transmission mechanism. The sensory level is an index value indicating to what extent the occupant of the vehicle feels uncomfortable due to the noise. The higher the sensory level, the more likely it is that the occupant finds the noise uncomfortable. By estimating the sensory level as described above, it is possible to estimate whether the noise generated by the rattling sound is likely to be generated.

The power source may include an internal combustion engine. The power transmission mechanism may include a transmission. The variables on the output of the power transmission mechanism may include at least one parameter of a crank angle, engine rotational speed, and engine load before starting the internal combustion engine. The variables indicating the state of the power transmission mechanism may include at least one parameter of a gear ratio of the transmission, a temperature of hydraulic oil supplied to the transmission, and whether rotation of a rotating shaft in the transmission is fixed.

With the configuration stated above, the noise level can be estimated in consideration of at least one parameter of the crank angle, the engine rotational speed, and the engine load before starting the internal combustion engine. The parameter is associated with external force that generates the rattling sound. By considering the external force that generates the rattling sound, the accuracy of the noise level estimation within the vehicle can be improved.

Furthermore, with the configuration stated above, the noise level is estimated by referring to at least one parameter of the gear ratio, the temperature of the hydraulic oil, and whether rotation of the rotating shaft in the transmission is fixed. The parameter is associated with the probability of generating the rattling sound when applying the external force that may generate the rattling sound. By considering the probability of generating the rattling sound, the accuracy of the noise level estimation within the vehicle can be improved.

The power source may include a motor generator, and the variables on the output of the power source may include a vibration damping control amount, from among control amounts of the motor generator, calculated to dampen vibration caused by driving the internal combustion engine.

With the configuration stated above, the noise level can be estimated in consideration of the torque output by the motor generator adjusted by the vibration damping control amount. Accordingly, the accuracy of the noise level estimation within the vehicle can be improved.

The input variables may include variables on background noise for noise generated by the rattling sound, and the variables on background noise may include at least one parameter of vehicle speed, engine rotational speed, and open or closed state of windows provided in the vehicle.

With the configuration stated above, it is possible to estimate noise level caused by the rattling sound in consideration of the parameters that may generate the background noise. Accordingly, the accuracy of the noise level estimation within the vehicle can be improved.

The variables indicating the sensory level may include a protrusion amount, which is a value indicating a difference between sound pressure of the noise in the cabin and sound pressure of the background noise for the noise generated by the rattling sound.

With the configuration stated above, the protrusion amount, which is the difference between the sound pressure of the noise in the cabin and the sound pressure of the background noise, can be calculated as the variable indicating the sensory level. Consequently, it is possible to estimate the noise level within the vehicle compartment in comparison to the background noise.

A vehicle control device includes the execution unit and the storage device of the noise estimation device. The power source includes an internal combustion engine and a motor generator. The execution unit executes damping control for reducing the rattling sound when the sensory level is equal to or higher than a prescribed value. The damping control includes a process of prohibiting a starting of the internal combustion engine, or a process of reducing engine load.

With the configuration stated above, when the estimated noise is large, the internal combustion engine can be controlled so as to reduce the rattling sound. Consequently, it is possible to reduce the noise generated within the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
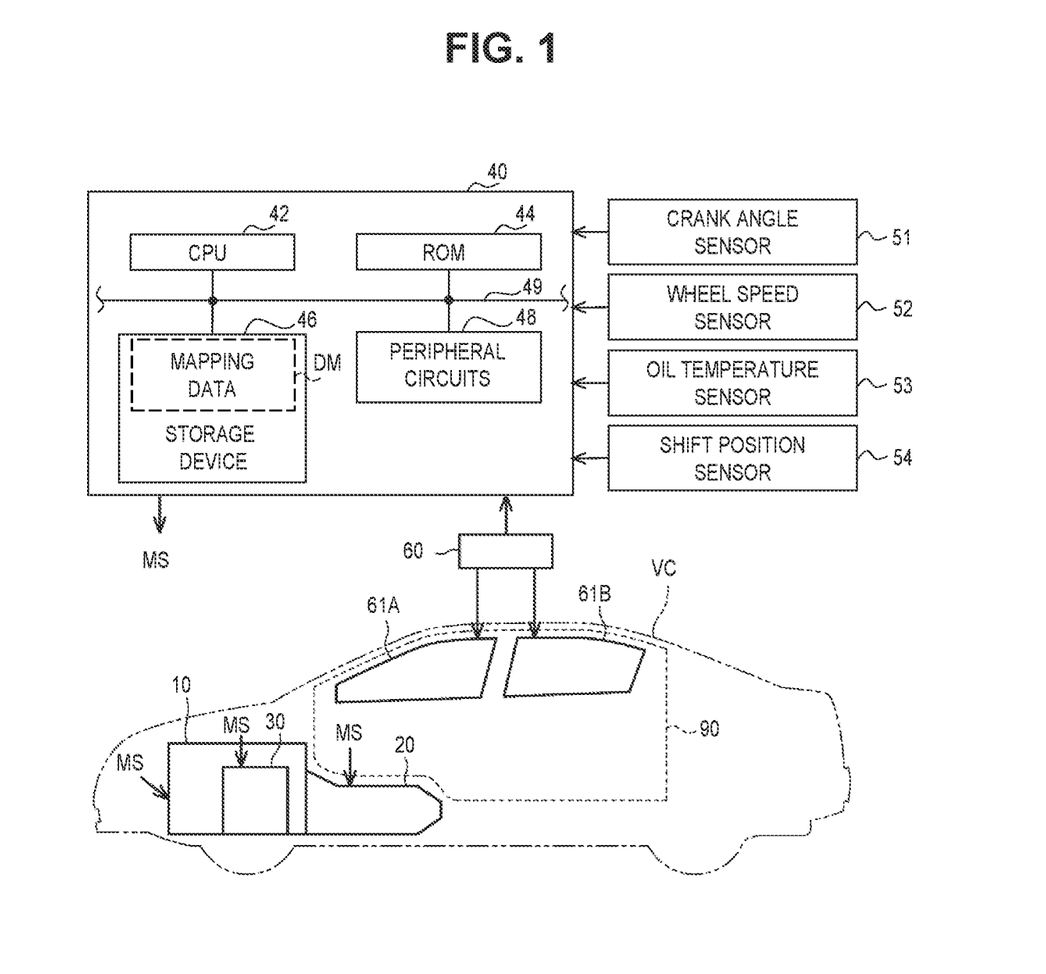
FIG. 1 is a schematic view illustrating one embodiment of a vehicle and a control device.

Hereinafter, one embodiment of the noise estimation device and the vehicle control device will be described referring to FIGS. 1 to 3. FIG. 1 shows a vehicle VC equipped with an internal combustion engine 10 as a power source. The vehicle VC may include a motor generator 30 as a power source. An output voltage of an inverter is applied to terminals of the motor generator 30. The vehicle VC may include a plurality of motor generators.

The vehicle VC includes a transmission 20 that constitutes a power transmission mechanism. The transmission 20 includes a rotating shaft. The rotating shaft of the transmission 20 transmits the power output by driving the power source. One example of the transmission 20 consists of a rotating shaft and gears. The transmission 20 can switch a plurality of gear ratios. The transmission 20 converts and transmits the rotation of the power source according to the gear ratio.

The transmission 20 may include a parking lock mechanism. The parking lock mechanism operates, for example, when the P range is selected by a shift lever operable by the driver of the vehicle VC. The P range may be selected by a parking switch. The parking lock mechanism is a mechanism that mechanically stops the rotation of the rotating shaft in the transmission 20. The parking lock mechanism is operated by an electric actuator. In one specific exemplified configuration of the parking lock mechanism, a locking member moves when the parking lock mechanism is activated. The locking member moves to a position at which it meshes with a gear rotating in conjunction with the rotating shaft. The rotation of the gear is regulated by the locking member meshing with the gear. That is, when the P range is selected and the parking lock mechanism is activated, the rotating shaft of the transmission 20 is fixed. Therefore, torsional characteristics of the transmission 20 when the P range is selected are different from those of the transmission 20 when the P range is not selected.

The vehicle VC may include a power split device that constitutes the power transmission mechanism. The power split device can split the power of the internal combustion engine 10 and the motor generator. The power split device is equipped with a planetary gear mechanism. The power split device is mechanically connected to a crankshaft of the internal combustion engine 10. A carrier of the planetary gear mechanism is mechanically connected to the crankshaft of the internal combustion engine 10. A sun gear of the planetary gear mechanism is mechanically connected to the rotating shaft of the motor generator 30. Drive wheels of the vehicle are mechanically connected to a ring gear of the planetary gear mechanism via the transmission 20.

In the vehicle VC, a mechanism that mechanically connects the power source to wheels can be considered as the power transmission mechanism. For example, differential gears and drive shafts may also power transmission mechanisms.

The vehicle VC may be provided with an oil pump. A driven shaft of the oil pump is mechanically connected to the carrier of the planetary gear mechanism in the power split device. The oil pump is a pump that discharges oil, as hydraulic oil, in an oil pan to a hydraulic control circuit in the transmission 20.

The vehicle VC includes a cabin 90 as shown in FIG. 1. The cabin 90 constitutes a vehicle compartment in which the occupant of the vehicle VC can ride. Seats are housed in the cabin 90. The cabin 90 is partitioned by, for example, a panel constituting the interior of the vehicle VC. In the vehicle VC, a compartment accommodating the internal combustion engine 10 is located in front of the vehicle with respect to the cabin 90.

The vehicle VC may be provided with a window that can be opened and closed. FIG. 1 shows a first window 61A and a second window 61B as the exemplified windows provided in the vehicle VC. The first window 61A is attached to a front door. The second window 61B is attached to a rear door. In a case where at least one of the windows provided in the vehicle VC is open, the cabin 90 is opened through the open windows.

The vehicle VC may include a power window control device 60 that controls opening and closing of the windows. The power window control device 60 is attached to, for example, the doors of the vehicle VC. The power window control device 60 includes an operation switch. The operation switch is installed at a position where it can be operated by the occupant of the vehicle VC. The operation switch is configured by a plurality of switches corresponding to each window provided in the vehicle VC. The power window control device 60 includes a control unit. The control unit has a function of transmitting a signal for opening and closing the window according to a state of the operation switch. For example, the power window control device 60 may open and close the first window 61A or the second window 61B.

The vehicle VC is provided with various sensors. FIG. 1 shows a crank angle sensor 51, a wheel speed sensor 52, an oil temperature sensor 53, and a shift position sensor 54 as examples of various sensors. The crank angle sensor 51 can detect a rotation angle of the crankshaft. The wheel speed sensor 52 is attached so as to correspond to each wheel provided in the vehicle VC. The wheel speed sensor 52 can detect the wheel speed of each wheel. The oil temperature sensor 53 can detect a temperature of the hydraulic oil supplied to the transmission 20. The shift position sensor 54 can detect a shift position operated by the shift lever or the parking switch. The detection signals from the various sensors are input to the control device 40 provided in the vehicle.

The vehicle VC is provided with a control device 40. The control device 40 controls the internal combustion engine 10. The control device 40 operates various operation units of the internal combustion engine 10 in order to control, for example, torque and an exhaust component ratio, which are control amounts of the internal combustion engine 10. Further, the control device 40 can also control the motor generator 30. The control device 40 operates the inverter in order to control, for example, torque and rotation speed, which are control amounts of the motor generator 30. The control device 40 can also control the transmission 20. A hydraulic control circuit is operated in the transmission 20 so as to control the transmission 20 by adjusting the pressure of the hydraulic oil. The control device 40 can also operate the parking lock mechanism provided in the transmission 20. In FIG. 1, a signal transmitted by the control device 40 to operate the internal combustion engine 10, the inverter of the motor generator 30, and the transmission 20 is displayed as an operation signal MS.

The control device 40 includes a CPU 42, a ROM 44, a storage device 46, which is an electrically rewritable non-volatile memory, and a peripheral circuit 48. The CPU 42, the ROM 44, the storage device 46, and the peripheral circuit 48 can communicate with each other via a local network 49. Examples of the peripheral circuit 48 include circuits such as a circuit that generates a clock signal for defining the internal operations, a power supply circuit, and a reset circuit. The control device 40 controls the control amounts by executing a program stored in the ROM 44 by the CPU 42.

The control device 40 refers to signals output by various sensors. The control device 40 refers to an output signal of the crank angle sensor 51. The control device 40 calculates the engine rotational speed based on the output signal of the crank angle sensor 51. The control device 40 refers to an output signal of the wheel speed sensor 52. The control device 40 calculates the vehicle speed as the speed of the vehicle VC based on the output signal of the wheel speed sensor 52. The control device 40 refers to an output signal of the oil temperature sensor 53. The control device 40 calculates the temperature of the hydraulic oil based on the output signal of the oil temperature sensor 53. The control device 40 refers to a shift position detected by the shift position sensor 54.

The control device 40 can refer to a signal transmitted by a control unit of the power window control device 60. The control device 40 can acquire the open/closed state of the window based on the signal.

The storage device 46 of the control device 40 stores the mapping data DM, which is data that defines a mapping learned by machine learning. The mapping data DM is used in a process of estimating the sensory level. Details of the mapping data DM and the sensory level will be described later.

Some of the processes executed by the control device 40 will be described. These processes are implemented by executing the program stored in the ROM 44 by the CPU 42. The control device 40 executes a drive torque setting process. The drive torque setting process is a process of calculating a drive torque command value Trq*, which is a command value of the torque to be applied to the drive wheels. The drive torque command value Trq* is calculated by inputting an operation variable of an accelerator operating member provided in the vehicle VC, and becomes larger as the operation variable increases.

The control device 40 can execute a vibration control process. The vibration control process is a process of damping the vibration, via controlling the motor generator 30, generated by driving the internal combustion engine 10. In the vibration damping process, the control device 40 calculates a vibration damping amount as the control amount of the motor generator 30. One example of the vibration damping control amount is a gain for adjusting the torque of the motor generator 30. The vibration damping control amount may be a correcting value by which the torque of the motor generator 30 is changed.

The control device 40 executes an estimation process. The estimation process is a process for estimating the sensory level of the noise. The sensory level relates to the noise caused when the rattling sound generated by the operation of the transmission 20 is transmitted to the cabin 90. The sensory level is an index value indicating to what extent the occupant of the vehicle VC feels uncomfortable due to the noise. The higher the sensory level is, the more likely it is that the occupant find the noise to be uncomfortable. The process flow in which the control device 40 executes the estimation process will be described hereinbelow.

The rattling sound is not limited to sound generated when the gears mate with each other. One example of when the rattling sound may occur is when a spline shaft is inserted into a spline hole. One example of a cause of the rattling sound may be sliding at a portion which connects members. One example of a cause of the rattling sound may be a clearance between a cylinder used in the actuator and a friction material mounted in the cylinder. One example of a cause of the rattling sound may be a clearance between a hub and a friction material mounted in the hub. For example, a hub may be a clutch hub used in a clutch.

Figure 2:
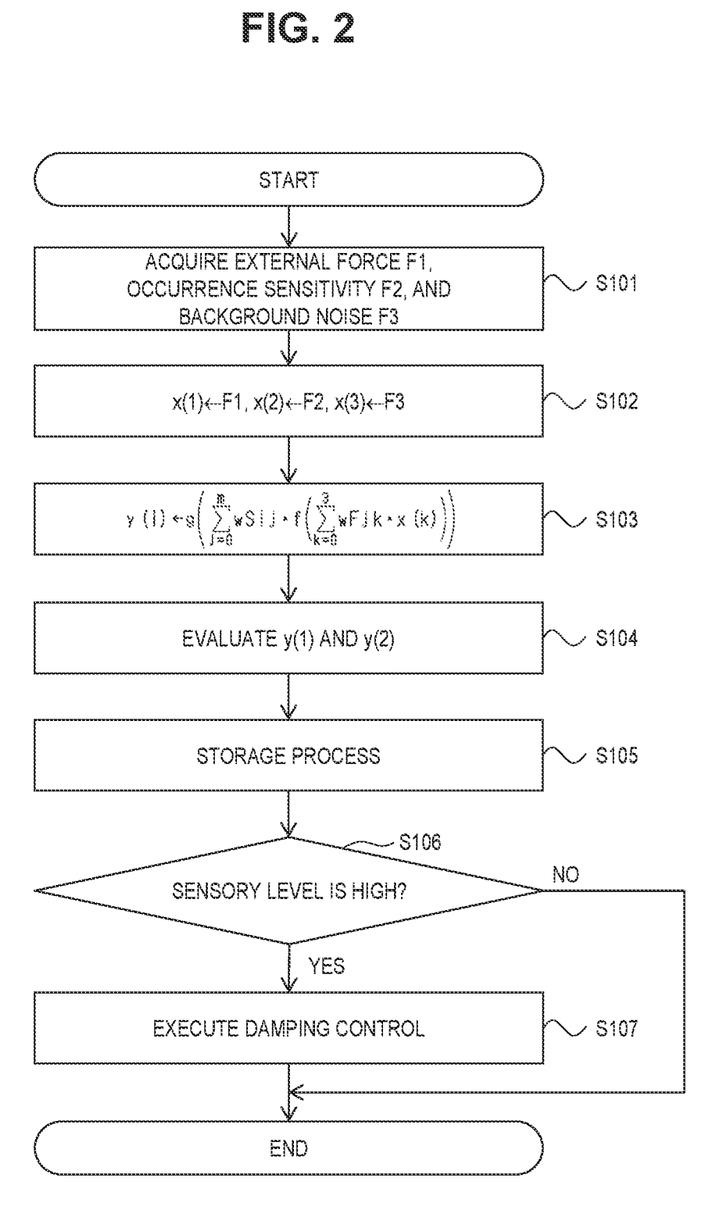
FIG. 2 is a flowchart illustrating a procedure of a process executed by the control device according to the same embodiment.

FIG. 2 shows a procedure of a process executed by the control device 40. The process shown in FIG. 2 is implemented by the CPU 42 repeatedly executing the program stored in the ROM 44, for example, at a predetermined cycle. Hereinbelow, a step number of each process is represented by a number prefixed with "S".

In the series of processes shown in FIG. 2, the CPU 42 first acquires a feature value for estimating the sensory level (S101). The CPU 42 acquires an external force F1 as the feature value. The CPU 42 acquires an occurrence sensitivity F2 as the feature value. The CPU 42 may acquire background noise F3 as the feature value.

The external force F1, which is the first feature value, will be described hereinbelow. For the external force F1, a value on the output of the power source is adopted. In other words, the external force F1 is a value serving as an index of the external force that acts on a location where the rattling sound is generated so as to produce the rattling sound. The CPU 42 can acquire the engine rotational speed as the external force F1. The CPU 42 can also acquire parameters other than the engine rotational speed as the external force F1. A group of parameters that can be acquired as the external force F1 is defined as a first parameter group. The first parameter group may include the crank angle before starting the internal combustion engine 10, as well as the engine rotational speed. The first parameter group may include the engine load of the internal combustion engine 10. The first parameter group may include a retard amount of the ignition timing in the internal combustion engine 10. The first parameter group may include a mechanical time constant for the motor generator 30. The first parameter group may include a vibration damping control amount of the motor generator 30.

An occurrence sensitivity F2, which is a second feature value, will be described hereinbelow. A value indicating the state of the power transmission mechanism is adopted as the occurrence sensitivity F2. In other words, the occurrence sensitivity F2 is a value that is an index indicating how likely it is that the rattling sound will be generated when the external force acts on the power transmission mechanism. The CPU 42 can acquire the gear ratio of the transmission 20 as the occurrence sensitivity F2. The CPU 42 can also acquire parameters other than the gear ratio as the occurrence sensitivity F2. A group of parameters that can be acquired as the occurrence sensitivity F2 is defined as a second parameter group. The second parameter group may include the temperature of the hydraulic oil, as well as the gear ratio. The second parameter group may include a value indicating whether the shift position is in the P range.

A background noise F3, which is a third feature value, will be described hereinbelow. The background noise F3 is a value that is an index of noise caused by sounds other than the rattling sound from among the noises that can be heard in the cabin 90. In other words, the background noise F3 is a value on the background noise with respect to the noise derived from the rattling sound. The CPU 42 can acquire the vehicle speed as the background noise F3. The CPU 42 can also acquire parameters other than the vehicle speed as the background noise F3. A group of parameters that can be acquired as the background noise F3 is defined as a third parameter group. The third parameter group may include the engine rotational speed, as well as the vehicle speed. The third parameter group may include a value indicating the open/closed state of the window of the vehicle VC. The open/closed state of the window may include information on a position where the open window is attached.

Figure 3:
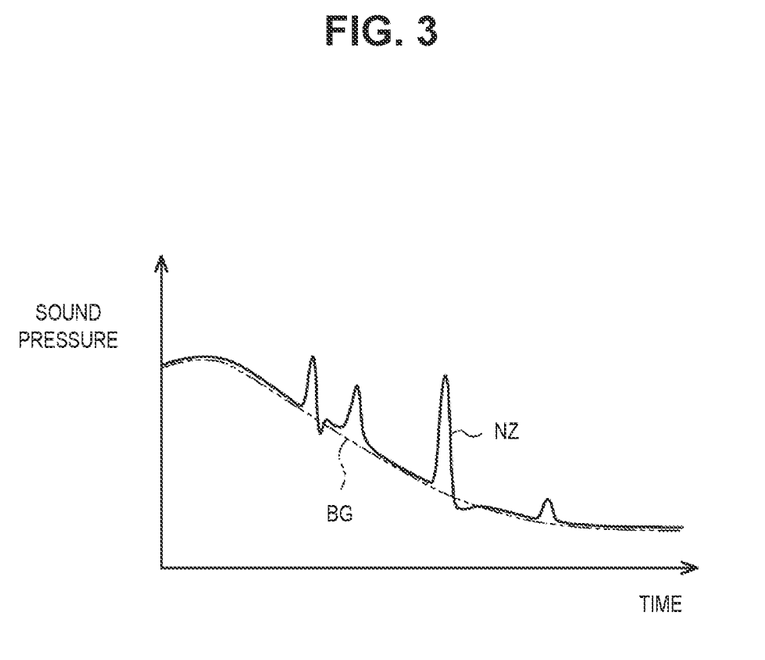
FIG. 3 is a diagram illustrating a protrusion amount of the noise in comparison to background noise.

Referring to FIG. 3, a relationship between the noise transmitted to the cabin 90 and the background noise will be described hereinbelow. In FIG. 3, noise NZ that can be heard in the cabin 90 is depicted by a solid line. The noise NZ can be measured by, for example, a noise meter arranged in the cabin 90. The noise meter may be arranged outside the vehicle VC. If a microphone for collecting the voice of the occupant is attached to the cabin 90, the noise NZ can also be measured by the microphone. Further, in FIG. 3, a comparative sound BG as a comparative example is depicted by a chain double-dashed line. The comparative sound BG indicates a sound pressure when it is assumed that no rattling sound is generated with respect to the noise NZ. The comparative sound BG corresponds to the background noise with respect to the noise derived from the rattling sound. The comparative sound BG includes, for example, road noise which is noise generated by friction or collision between tires of the traveling vehicle VC and a road surface. Further, for example, the comparative sound BG may include engine noise, which is noise generated from the internal combustion engine 10 during operation. Moreover, for example, the comparative sound BG may include external noise which is noise generated outside the vehicle VC. While the rattling sound is generated, as shown in FIG. 3, there is a period in which the sound pressure of the noise NZ becomes larger than that of the comparative sound BG. During the period when the noise NZ is louder than the comparative sound BG, the rattling sound is generated, and the noise derived from the rattling sound is transmitted to the cabin 90. In a case where the noise NZ is compared with the comparative sound BG, an amount in which the sound pressure of the noise NZ is larger than that of the comparative sound BG is referred to as a protrusion amount hereinbelow. Further, a peak in the noise NZ is counted as one protrusion. In the example shown in FIG. 3, the number of protrusions is four.

Returning to FIG. 2, the CPU 42 then substitutes the acquired data by the process of S101 for the input variables $x(1)$ to $x(3)$ for the mapping defined by the mapping data DM stored in the storage device 46 shown in FIG. 1 (S102). More specifically, the CPU 42 substitutes the external force F1 for the input variable $x(1)$. The CPU 42 substitutes the occurrence sensitivity F2 for the input variable $x(2)$. The CPU 42 substitutes the background noise F3 for the input variable $x(3)$.

The CPU 42 calculates the values of the output variables $y(1)$ and $y(2)$, which are variables indicating the sensory levels, by substituting the values of the input variables $x(1)$ to $x(3)$ to the mapping (S103).

The output variable $y(1)$ indicates the protrusion amount. For example, the maximum value of the protrusion amount in the specified period may be set as the output variable $y(1)$. The output variable $y(2)$ indicates the number of times that the noise NZ is larger than the comparative sound BG. For example, the number of protrusions during a period from the time when the first sound pressure protrusion was observed until the specified period has elapsed may be set as the output variable $y(2)$. The output variable $y(1)$ may be the average value of the protrusion amounts during a period from the time when the first protrusion was observed until the specified period has elapsed.

In the present embodiment, a function approximator is exemplified as the mapping, and more specifically, a fully-connected feed-forward neural network having one intermediate layer is exemplified. Specifically, the input variables $x(1)$ to $x(3)$ to which the values are substituted by the process of S103, and a bias parameter $x(0)$ are converted by a linear mapping defined by a coefficient $wFjk$ ($j=1$ to m, $k=0$ to 3). Each of the "m" values converted by the linear mapping defined by the coefficient $wFjk$ is substituted for the activation function f. Accordingly, node values in the intermediate layer are determined. Further, each of the node values in the intermediate layer is transformed by a linear mapping defined by a coefficient $wSij$ ($i=1$ to 2). The values of the output variables $y(1)$ and $y(2)$ are determined by substituting each of the node values in the converted intermediate layer for the activation function g. One example of the activation function f is a hyperbolic tangent. One example of the activation function g is a hyperbolic tangent.

The mapping data DM will be described hereinbelow. The mapping data DM is a pre-trained model. The learning of the mapping data DM is performed using teacher data. The teacher data is generated according to the parameters selected as the external force F1, the parameters selected as the occurrence sensitivity F2, and the parameters selected as the background noise F3. In one example of the mapping data DM, a set of teacher data, including data relating to engine rotational speed, gear ratio and vehicle speed, as well as data indicating the actual sensory level with respect to the engine rotational speed, the gear ratio, and the vehicle speed, is used for learning. For example, the actual sensory level may be measured and obtained by the noise meter arranged in the cabin 90. The teacher data can be generated by acquiring the engine rotational speed, the gear ratio, and the vehicle speed at the same timing as when the protrusion amount and the number of protrusions, which are sensory levels, are acquired.

Returning to FIG. 2, the CPU 42 evaluates the sensory level based on the values of the output variables $y(1)$ and y(2) (S104). The sensory level and the protrusion amount have a relationship such that the larger the protrusion amount is, the higher the sensory level is. The sensory level and the protrusion amount have a relationship such that the higher the number of protrusions is, the higher the sensory level is. One example of a configuration for evaluating the sensory level will be described. For example, the CPU 42 may determine whether the value of the output variable y(1) is equal to or greater than a specified first threshold. For example, the CPU 42 may determine whether the value of the output variable y(2) is equal to or greater than a specified second threshold. In a case where the value of the output variable y(1) is equal to or greater than the first threshold and the value of the output variable y(2) is equal to or greater than the second threshold, the CPU 42 determines that the sensory level is equal to or greater than a prescribed value and thus the sensory level is high. In a case where the value of the output variable y(1) is less than the first threshold or the value of the output variable y(2) is less than the second threshold, the CPU 42 determines that the sensory level is low. The first threshold and the second threshold are values calculated in advance by, for example, experiments. The first threshold is set as a value at which the occupant of the vehicle VC feel uncomfortable with the noise generated by the rattling sound when the protrusion amount is equal to or greater than the first threshold. The second threshold is set as a value at which the occupant of the vehicle VC feel uncomfortable with the noise generated by the rattling sound when the number of protrusions is equal to or greater than the second threshold. The configuration for evaluating the sensory level is not limited to the configuration stated above. For example, in a case where the value of the output variable y(1) is equal to or greater than the first threshold, even if the value of the output variable y(2) is less than the second threshold, the CPU 42 may determine that the sensory level is high.

The CPU 42 executes a storage process of storing the estimation result of the sensory level in the storage device 46 (S105). In the storage process, the CPU 42 stores the estimation result of the sensory level together with the feature value acquired in the process of S101 in the storage device 46. In the storage process, the CPU 42 may store the evaluation result of the sensory level. The information stored in the storage process can also be used for learning the mapping data DM as new teacher data.

The CPU 42 determines whether the sensory level is high (S106). In a case where the sensory level is high (S106: YES), the CPU 42 executes damping control for reducing the rattling sound (S107).

One example of the damping control will be described. As an example, in the damping control when the internal combustion engine 10 is in operation, the CPU 42 can execute a process of reducing the engine load of the internal combustion engine 10. For example, the CPU 42 may change an operating point of the internal combustion engine 10 by increasing the engine rotational speed. The CPU 42 can also reduce the retard amount of the ignition timing so as to reduce engine torque. Further, as another example, in the damping control when the internal combustion engine 10 is stopped, the CPU 42 can execute a process of prohibiting the engine start of the internal combustion engine 10. Moreover, the CPU 42 can prevent the internal combustion engine 10 from starting easily. For example, it is possible to prevent the internal combustion engine 10 from starting easily by changing a value as the threshold in the conditions for starting the internal combustion engine 10. Further, as one example of the damping control, the CPU 42 may prohibit the intermittent operation of the internal combustion engine 10. As one example of the damping control, the CPU 42 may control the motor generator 30 such that fluctuation of torque output by the motor generator 30 is small.

When the process of S107 is completed, the CPU 42 temporarily ends the series of processes shown in FIG. 2. In a case where it is determined as NO in the process of S106, the CPU 42 temporarily ends the series of processes shown in FIG. 2.

The operation of the present embodiment will be described hereinbelow. The CPU 42 estimates the sensory level based on the external force F1, the occurrence sensitivity F2, and the background noise F3. The CPU 42 determines whether the sensory level is high. Further, in a case where the sensory level is high, the CPU 42 executes damping control for reducing the rattling sound.

The advantageous effect of the present embodiment will be described hereinbelow.

(1) The sensory level can be comprehensively estimated in consideration of three elements, i.e., the external force F1, the occurrence sensitivity F2, and the background noise F3.

(2) Since the external force F1 designated as the feature value is used as the input variable for the mapping, the magnitude of the external force that generates the rattling sound can be taken into consideration when estimating the sensory level. Accordingly, it is possible to estimate the sensory level with high accuracy. For example, in a case where the crank angle before starting the internal combustion engine 10 is adopted as the external force F1, a pressure fluctuation in a combustion chamber can be considered based on a piston position when the internal combustion engine 10 is started. For example, in a case where the engine rotational speed, the engine load, or the retard amount of the ignition timing is adopted as the external force F1, the torque of the internal combustion engine 10 can be taken into consideration. For example, in a case where the mechanical time constant or the vibration damping control amount of the motor generator 30 is adopted as the external force F1, the torque of the motor generator 30 can be taken into consideration.

(3) Since the occurrence sensitivity F2 as the feature value is used as the input variable for the mapping, the extent to which the rattling sound is likely to be generated can be taken into consideration when estimating the sensory level. Accordingly, it is possible to estimate the sensory level with high accuracy. For example, in a case where the gear ratio is adopted as the occurrence sensitivity F2, an amount of clearance between mated gear teeth in the transmission 20 can be taken into consideration. For example, in a case where the temperature of the hydraulic oil is adopted as the occurrence sensitivity F2, a viscosity of the hydraulic oil can be taken into consideration. That is, it is possible to consider the damping when the gears mate with each other according to the viscosity of the hydraulic oil. For example, in a case where the determination regarding whether the shift position is in the P range is adopted as the occurrence sensitivity F2, torsional characteristics of the transmission 20 can be taken into consideration.

(4) The noise level can be estimated as the sensory level. Using the noise level as the index, it is possible to determine whether the occupant of the vehicle VC find that the noise is uncomfortable.

(5) Since the background noise F3 as the feature value is used as the input variable for the mapping, the parameters that may generate the background noise can be taken into consideration when estimating the sensory level. Consequently, the protrusion amount from the background noise can be estimated as the sensory level, and it is possible to more accurately estimate the noise level derived from the rattling sound. For example, in a case where the vehicle speed is adopted as the background noise F3, the road noise estimated from the vehicle speed can be taken into consideration. For example, in a case where the engine rotational speed is adopted as the background noise F3, the engine noise estimated from the engine rotational speed can be taken into consideration. For example, in a case where the open/closed state of the window is adopted as the background noise F3, the external noise can be taken into consideration.

(6) The number of protrusions can be estimated as the sensory level. Using the number of protrusions as the index, it is possible to determine whether the occupant of the vehicle VC find the noise to be uncomfortable.

(7) The operating point of the power source at which the sensory level becomes high can be specified. Consequently, it is possible to estimate whether the noise generated by the rattling sound is likely to be generated.

(8) It is possible to estimate whether the rattling sound is likely to be generated in the power transmission mechanism on the path through which the power is transmitted from the power source to the wheels, not limited to the rattling sound generated by the transmission 20.

(9) It is possible to execute the damping control in a case where the estimated sensory level is high. Therefore, it is possible to determine that the noise generated by the rattling sound is likely to be generated, and to carry out the damping control at an appropriate timing. By executing the damping control, the internal combustion engine 10 or the motor generator 30 can be controlled so as to reduce the rattling sound. Consequently, it is possible to reduce the noise transmitted to the cabin 90.

Correspondence

The correspondence between the matters in the embodiment stated above and the matters described in "SUMMARY" is as follows. The noise estimation device corresponds to the control device 40 of FIG. 1. The execution unit corresponds to the CPU 42 and ROM 44 of FIG. 1. The storage device corresponds to the storage device 46 of FIG. 1. The mapping data corresponds to the mapping data DM. The acquisition process corresponds to the process of S102 in FIG. 2. The estimation process corresponds to the process of S103 in FIG. 2. The vehicle control device corresponds to the control device 40 of FIG. 1.

Other Embodiments

The present embodiment can be modified and implemented as follows. The present embodiment and the following modified examples can be implemented in combination with each other unless technical contradiction occurs.

In the embodiment stated above, it is exemplified that one parameter selected from the first parameter group as the external force F1 is used as the input variable for the mapping. Several parameters may be selected from the first parameter group and used as the input variables. That is, at least one parameters may be acquired as the values of the input variables from the first parameter group.

Similarly, for the occurrence sensitivity F2, at least one parameters may be acquired as the values of the input variables from the second parameter group. Similarly, for the background noise F3, at least one parameter may be acquired as the values of the input variables from the third parameter group.

It is not essential to use background noise F3 as the input variable for mapping.

The characteristics of the vehicle VC may be used as the input variable for the mapping. For example, using various dimensions of the vehicle VC as the input variables, it is possible to consider how much the vibration is likely to be transmitted to the cabin 90.

Specification data at locations where the rattling sound may occur may be used as the input variable for mapping. For example, the number of gear teeth, the degree of backlash and the transmission errors may be used as the input variables.

The input variables to the map defined by the mapping data DM are not limited to those exemplified in the embodiment stated above. Feature values by which it is expected that the estimation accuracy will be further improved can be adopted as the input variables.

The neural network is not limited to a fully-connected feed-forward neural network. For example, a one-dimensional convolutional neural network may be employed. However, the trained model by machine learning is not limited to the neural network.

Although the neural network having one intermediate layer is exemplified, the number of intermediate layers may be two or more.

For the teacher data, the evaluation as to whether the sensory level is high may be labeled in advance with respect to the sensory level corresponding to the parameter used as the value of the input variable. In this case, the parameters and the evaluation compose a set of teacher data. Using the mapping data DM stated above, the evaluation result of the sensory level may be used as the output variable. In this case, the process of S104 in FIG. 2 can be omitted.

The mapping is not limited to the mapping with the protrusion amount and the number of protrusions as the output variables. The protrusion amount may be adopted as the output variable.

If the protrusion amount is smaller than a prescribed value, the teacher data may be created with the protrusion amount as "0". That is, the "protrusion" may be interpreted as a case where the difference in the sound pressure as compared with the background noise is equal to or greater than the prescribed value.

The mapping data DM may be learned using the teacher data adopted by replacing the collision energy between the members at the place where the rattling sound is generated with the protrusion amount. The collision energy can be calculated by simulation. Using the mapping data DM stated above, the collision energy may be used as the output variable. In this case, it can be determined that the sensory level is high in a case where the collision energy is equal to or greater than a specified determination value. The collision energy and the sensory level have a relationship such that the larger the collision energy is, the higher the sensory level is.

The mapping data DM may be learned using the teacher data adopted by replacing the number of collisions between the members at the place where the rattling sound is generated with the number of protrusions. The number of collisions can be calculated by simulation. Using the mapping data DM stated above, the number of collisions may be used as the output variable. In this case, it can be determined that the sensory level is high in a case where the number of collisions is equal to or greater than a specified determination value. The number of collisions and the sensory level have a relationship such that the higher the number of collisions, the higher the sensory level is.

In the embodiment stated above, the storage device for storing the estimation result is the same as the storage device for storing the mapping data DM, but the storage device is not limited thereto.

Instead of executing the storage process of storing the estimation result of the sensory level, a transmission process of transmitting the estimation result to, for example the manufacturer of the vehicle VC or the data analysis center may be executed. It is also possible to execute both the storage process and the transmission process.

The control device 40 may have a function corresponding to the control unit of the power window control device 60.

The execution unit is not limited to the CPU 42 and the ROM 44 to execute the software process. For example, a dedicated hardware circuit that processes with the hardware at least a part of what has been processed with the software in the embodiment may be provided. The dedicated hardware circuit may be, for example, an ASIC. That is, the execution unit may have any of the following configurations (A) to (C). (A) A processing device that executes all processes stated above according to a program and a program storage device such as a ROM that stores the program are provided. (B) A processing device and a program storage device that execute a part of the processes stated above according to a program, and a dedicated hardware circuit that executes the remaining processes are provided. (C) A dedicated hardware circuit for executing all processes stated above is provided. There may be a plurality of the software execution units having a processing device and a program storage device, or a plurality of the dedicated hardware circuits.

The vehicle to which the control device 40 can be applied is not limited to the vehicle VC shown in FIG. 1. The control device 40 can be applied to any vehicle having a power source and a power transmission mechanism.

What is claimed is:

1. A noise estimation device, which is applied to a vehicle provided with a power source and a power transmission mechanism that transmits power output by driving the power source, the noise estimation device comprising:
   an execution unit; and
   a storage device, wherein:
   the storage device stores mapping data which is data defining a mapping learned by machine learning;
   when variables on an output of the power source and variables indicating a state of the power transmission mechanism are input to the mapping as input variables, the mapping outputs, as output variables, variables indicating a sensory level of noise caused when rattling sound generated by an operation of the power transmission mechanism is transmitted to a cabin of the vehicle; and
   the execution unit is configured to:
   acquire the variables on the output of the power source and the variables indicating the state of the power transmission mechanism as values of the input variables; and
   estimate the sensory level based on values of the output variables output from the mapping by inputting the values of the input variables into the mapping.

2. The noise estimation device according to claim 1, wherein:
   the power source includes an internal combustion engine;
   the power transmission mechanism includes a transmission;
   the variables on the output of the power transmission mechanism include at least one parameter of a crank angle, engine rotational speed, and engine load before starting the internal combustion engine; and
   the variables indicating the state of the power transmission mechanism include at least one parameter of a gear ratio of the transmission, a temperature of hydraulic oil supplied to the transmission, and whether rotation of a rotating shaft in the transmission is fixed.

3. The noise estimation device according to claim 2, wherein:
   the power source includes a motor generator; and
   the variables on the output of the power source include a vibration damping control amount, from among control amounts of the motor generator, calculated to damp vibration caused by driving the internal combustion engine.

4. The noise estimation device according to claim 1, wherein:
   the input variables include variables on background noise for noise generated by the rattling sound; and
   the variables on background noise include at least one parameter of vehicle speed, engine rotational speed, and open or closed state of a window provided in the vehicle.

5. The noise estimation device according to claim 1, wherein variables indicating the sensory level include a protrusion amount, which is a value indicating a difference between sound pressure of the noise in the cabin and sound pressure of background noise for the noise generated by the rattling sound.

6. A vehicle control device comprising:
   the execution unit and the storage device of the noise estimation device according to claim 1, wherein:
   the power source includes an internal combustion engine and a motor generator;
   the execution unit is configured to execute damping control for reducing the rattling sound when the sensory level is equal to or higher than a prescribed value; and
   the damping control includes a process of prohibiting a starting of the internal combustion engine, or a process of reducing engine load.

* * * * *